(12) United States Patent
Seo et al.

(10) Patent No.: US 9,126,595 B2
(45) Date of Patent: Sep. 8, 2015

(54) APPARATUS AND METHOD FOR CALCULATING INTER-VEHICLE DISTANCE

(71) Applicant: Hyundai Mobis Co., Ltd., Seoul (KR)

(72) Inventors: Kyung Il Seo, Yongin (KR); Seung Wuk Moon, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/649,717

(22) Filed: Oct. 11, 2012

(65) Prior Publication Data
US 2014/0032078 A1    Jan. 30, 2014

(30) Foreign Application Priority Data

Jul. 24, 2012   (KR) .................. 10-2012-0080303

(51) Int. Cl.
| | |
|---|---|
| *B60W 30/14* | (2006.01) |
| *B60W 30/16* | (2012.01) |
| *G08G 1/16* | (2006.01) |
| *B60W 30/095* | (2012.01) |

(52) U.S. Cl.
CPC ............ *B60W 30/095* (2013.01); *B60W 30/16* (2013.01); *G08G 1/163* (2013.01); *B60W 30/14* (2013.01); *B60W 2550/30* (2013.01); *B60W 2550/302* (2013.01); *B60W 2550/306* (2013.01); *B60W 2550/308* (2013.01)

(58) Field of Classification Search
CPC ..... B60W 30/16; B60W 10/06; B60W 10/18; B60W 50/14; B60W 40/04; B60W 2550/302; B60W 2550/306; B60W 2550/308; B60W 20/143; G01S 2013/9325; G01S 19/40; G01S 13/931; G08G 1/16; G08G 1/22

USPC .......................................................... 701/96
See application file for complete search history.

(56) References Cited

U.S. PATENT DOCUMENTS

| | | | | |
|---|---|---|---|---|
| 4,549,181 | A | * | 10/1985 | Tachibana et al. ............ 340/904 |
| 5,189,619 | A | * | 2/1993 | Adachi et al. .................... 701/96 |
| 5,454,442 | A | * | 10/1995 | Labuhn et al. ................. 180/169 |
| 5,670,963 | A | * | 9/1997 | Kubota et al. .................... 342/70 |
| 5,949,530 | A | * | 9/1999 | Wetteborn .................... 356/5.01 |
| 6,025,797 | A | * | 2/2000 | Kawai et al. ...................... 342/70 |
| 6,061,001 | A | * | 5/2000 | Sugimoto ...................... 340/903 |

(Continued)

FOREIGN PATENT DOCUMENTS

| | | |
|---|---|---|
| DE | 10 2008 040631 A1 | 1/2010 |
| EP | 2 199 826 A1 | 6/2010 |

(Continued)

OTHER PUBLICATIONS

Naranjo et al., "Using Fuzzy Logic in Automated Vehicle Control," Intelligent Systems, IEEE, vol. 22, Issue 1, Jan.-Feb. 2007, pp. 36-45.*

(Continued)

*Primary Examiner* — Fadey Jabr
*Assistant Examiner* — Kevin P Mahne
(74) *Attorney, Agent, or Firm* — NSIP Law (57) ABSTRACT

Disclosed are an apparatus and a method for calculating an inter-vehicle distance that calculates a more accurate inter-vehicle distance by setting a physical limit value, by recognizing an inter-vehicle distance error occurring due to reasons such as an installation location of a sensor, a type of a vehicle, illegal remodeling of the vehicle, and the like, and thereby correcting an inter-vehicle distance.

20 Claims, 5 Drawing Sheets

(56) References Cited

U.S. PATENT DOCUMENTS

| | | | |
|---|---|---|---|
| 6,122,040 A * | 9/2000 | Arita et al. | 356/4.01 |
| 6,269,308 B1 * | 7/2001 | Kodaka et al. | 701/301 |
| 6,317,073 B1 * | 11/2001 | Tamatsu et al. | 342/70 |
| 6,384,768 B1 * | 5/2002 | Kai | 342/70 |
| 6,526,346 B2 * | 2/2003 | Ishizu et al. | 701/96 |
| 6,529,814 B2 * | 3/2003 | Ishizu et al. | 701/96 |
| 6,567,737 B2 * | 5/2003 | Nakamura et al. | 701/96 |
| 6,665,056 B2 * | 12/2003 | Shirai et al. | 356/5.05 |
| 6,690,319 B2 * | 2/2004 | Matsui et al. | 342/70 |
| 6,711,280 B2 * | 3/2004 | Stafsudd et al. | 382/106 |
| 6,717,546 B2 * | 4/2004 | Winter et al. | 342/165 |
| 6,763,318 B1 * | 7/2004 | Winter et al. | 702/158 |
| 6,825,756 B2 * | 11/2004 | Bai et al. | 340/435 |
| 6,879,249 B2 * | 4/2005 | Takahashi | 340/435 |
| 6,902,021 B2 * | 6/2005 | Kikuchi et al. | 180/170 |
| 6,927,699 B2 * | 8/2005 | Samukawa et al. | 340/903 |
| 6,941,216 B2 * | 9/2005 | Isogai et al. | 701/96 |
| 6,956,227 B2 * | 10/2005 | Miyazaki et al. | 250/559.38 |
| 7,136,753 B2 * | 11/2006 | Samukawa et al. | 701/301 |
| 7,158,218 B2 * | 1/2007 | Arita et al. | 356/4.01 |
| 7,274,436 B2 * | 9/2007 | Matsuura et al. | 356/4.01 |
| 7,283,212 B2 * | 10/2007 | Arita et al. | 356/5.01 |
| 7,295,147 B2 * | 11/2007 | Boecker et al. | 342/70 |
| 7,456,937 B2 * | 11/2008 | Nakamura | 356/4.01 |
| 7,457,699 B2 * | 11/2008 | Chia | 701/96 |
| 7,496,449 B2 * | 2/2009 | Samukawa et al. | 701/301 |
| 7,576,838 B2 * | 8/2009 | Shirai | 356/28 |
| 7,602,477 B2 * | 10/2009 | Nakamura et al. | 356/4.07 |
| 7,650,239 B2 * | 1/2010 | Samukawa et al. | 701/300 |
| 7,684,921 B2 * | 3/2010 | Kojima et al. | 701/96 |
| 7,761,236 B2 * | 7/2010 | Samukawa et al. | 701/301 |
| 7,843,381 B2 * | 11/2010 | Matsuoka | 342/132 |
| 8,010,274 B2 * | 8/2011 | Sawada | 701/96 |
| 8,072,662 B2 * | 12/2011 | Maeno et al. | 359/198.1 |
| 8,125,372 B2 * | 2/2012 | Focke et al. | 342/70 |
| 8,155,856 B2 * | 4/2012 | Sekiguchi | 701/96 |
| 8,164,628 B2 * | 4/2012 | Stein et al. | 348/148 |
| 8,170,769 B2 * | 5/2012 | Tsuchiya et al. | 701/93 |
| 8,284,383 B2 * | 10/2012 | Beppu et al. | 356/4.07 |
| 8,355,118 B2 * | 1/2013 | Ogawa et al. | 356/4.07 |
| 8,543,309 B2 * | 9/2013 | Taneyhill et al. | 701/96 |
| 8,615,352 B2 * | 12/2013 | Maruyama | 701/96 |
| 2002/0189875 A1 * | 12/2002 | Asanuma et al. | 180/169 |
| 2004/0066285 A1 * | 4/2004 | Sekiguchi | 340/435 |
| 2004/0140143 A1 * | 7/2004 | Saeki et al. | 180/271 |
| 2005/0010351 A1 * | 1/2005 | Wagner et al. | 701/96 |
| 2005/0062615 A1 * | 3/2005 | Braeuchle et al. | 340/903 |
| 2005/0159875 A1 | 7/2005 | Chia | |
| 2006/0103927 A1 * | 5/2006 | Samukawa et al. | 359/436 |
| 2006/0289216 A1 | 12/2006 | Kato | |
| 2007/0150134 A1 * | 6/2007 | Yamamoto | 701/30 |
| 2008/0078600 A1 | 4/2008 | Inoue et al. | |
| 2011/0156955 A1 * | 6/2011 | Jeong | 342/359 |
| 2011/0190972 A1 * | 8/2011 | Timmons et al. | 701/29 |
| 2011/0222732 A1 * | 9/2011 | Higuchi et al. | 382/104 |
| 2011/0246043 A1 * | 10/2011 | Maruyama | 701/96 |
| 2012/0109421 A1 * | 5/2012 | Scarola | 701/2 |
| 2012/0239268 A1 * | 9/2012 | Chen et al. | 701/96 |
| 2012/0330527 A1 * | 12/2012 | Kumabe et al. | 701/96 |
| 2013/0124064 A1 * | 5/2013 | Nemoto | 701/96 |

FOREIGN PATENT DOCUMENTS

| | | |
|---|---|---|
| JP | 2002-071808 A | 3/2002 |
| JP | 2010-035820 A | 2/2012 |
| KR | 10-2004-0037589 A | 5/2004 |
| KR | 10-2009-0062520 A | 6/2009 |
| KR | 10-2011-0073233 A | 6/2011 |
| KR | 10-2012-0053217 A | 5/2012 |

OTHER PUBLICATIONS

Korean Office Action issued Aug. 20, 2013 in counterpart Korean Application No. 10-2012-0080303 (4 pages, in Korean).

Extended European Search Report issued Nov. 27, 2013 in counterpart European Application No. 12187984.5 (6 pages, in English).

* cited by examiner

FIG. 1

RELATED ART

FIG. 2

RELATED ART

APPARATUS AND METHOD FOR CALCULATING INTER-VEHICLE DISTANCE

CROSS-REFERENCE TO RELATED APPLICATIONS

This application claims priority to and the benefit of Korean Patent Application No. 10-2012-0080303 filed in the Korean Intellectual Property Office on Jul. 24, 2012, the entire contents of which are incorporated herein by reference.

TECHNICAL FIELD

The present invention relates to an apparatus and a method for calculating an inter-vehicle distance, and more particularly, to an apparatus and a method for calculating an inter-vehicle distance that calculates a more accurate inter-vehicle distance by setting a physical limit value and recognizing an inter-vehicle distance error occurring due to reasons such as an installation location of a sensor, a type of a vehicle, illegal remodeling of the vehicle, and the like, thereby correcting an inter-vehicle distance.

BACKGROUND ART

Currently, the number of vehicles applied with a smart cruise control (SCC) system has been increasing.

The SCC system is a system that controls a vehicle to maintain an inter-vehicle distance by measuring an inter-vehicle distance with a preceding vehicle using radar.

Accordingly, in the SCC system, it is important to accurately measure the inter-vehicle distance with the preceding vehicle. However, detection capability of the radar varies based on an installation location of the radar. Specifically, generally used radar has performance of a vertical detection angle of about ±2 degrees to ±4 degrees in a vertical direction. When a detection angle is too large, a lower end of road or an upper structure of the road is erroneously detected. When the detection angle is too small, error recognition of a detection distance occurs based on the installation location of the radar.

In particular, when the radar is installed around a lower end of a license plate of a vehicle or around a fog lamp, and when ground clearance of the preceding vehicle is high or when a rear shape such as a ready-mixed concrete (RMC) truck is different from a general vehicle, the radar may not accurately verify an inter-vehicle distance.

Alternatively, even when the preceding vehicle is a heavy-duty truck and is a vehicle of which rear safety valve is illegally remodeled, the inter-vehicle distance may not be accurately measured.

When the inter-vehicle distance is not accurately measured, the SCC system may put the brake on the vehicle at a location closer to the preceding vehicle than expected. If the above occurs, a collision with the preceding vehicle may occur.

Figure 1:
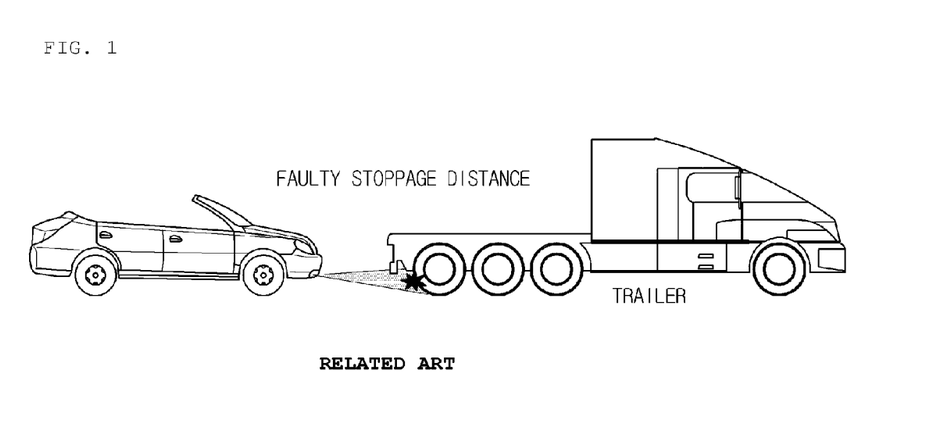
FIG. 1 is a diagram illustrating an example of a case in which an inter-vehicle distance is not accurately measured according to a related art.

FIG. 1 is a diagram illustrating an example of a case in which an inter-vehicle distance is not accurately measured according to a related art.

Referring to FIG. 1, a preceding vehicle is a trailer having high ground clearance and existing inter-vehicle distance measurement is performed in such a manner that radar detects a wheel portion of the trailer, instead of detecting the rear of the vehicle. Accordingly, an error occurs in timing for an SCC system to put the brake on the vehicle and thus, a stoppage distance becomes faulty.

Figure 2:
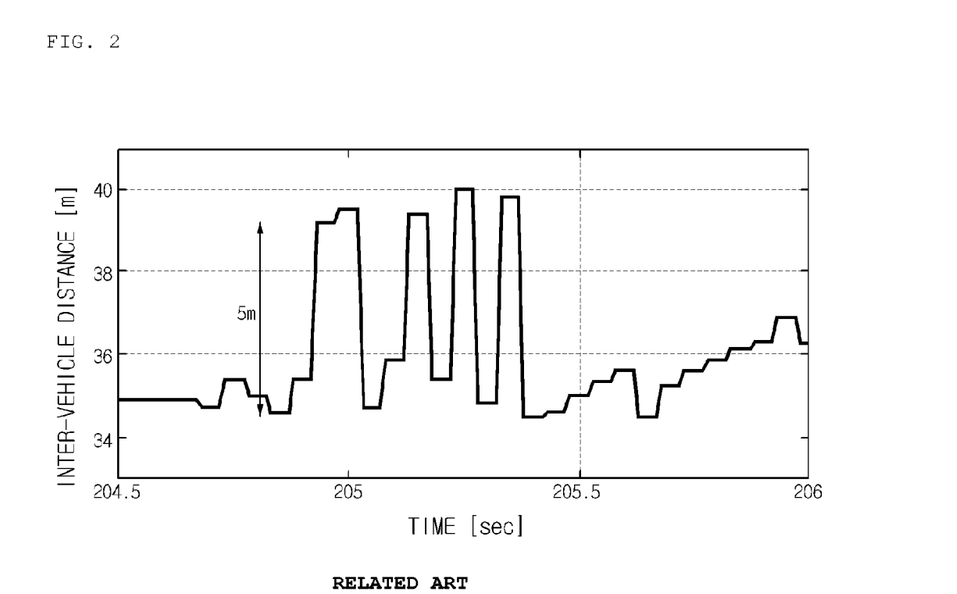
FIG. 2 is a graph illustrating an example of an inter-vehicle distance with the same preceding vehicle measured by an inter-vehicle distance measuring apparatus according to the related art.

FIG. 2 is a graph illustrating an example of an inter-vehicle distance with the same preceding vehicle measured by an inter-vehicle distance measuring apparatus according to the related art.

Referring to FIG. 2, it can be known that the same circumstance as FIG. 1 occurred around 205 seconds and thus, an error of about 5 meters occurred within the inter-vehicle distance.

Accordingly, there is a need for a method of calculating an accurate inter-vehicle distance by correcting an error when the error occurs within an inter-vehicle distance with a preceding vehicle due to a variety of reasons.

SUMMARY OF THE INVENTION

The present invention has been made in an effort to provide an apparatus and a method for calculating an inter-vehicle distance that calculates a more accurate inter-vehicle distance by setting a physical limit value and recognizing an inter-vehicle distance error occurring due to reasons such as an installation location of a sensor, a type of a vehicle, illegal remodeling of the vehicle, and the like, thereby correcting an inter-vehicle distance.

An exemplary embodiment of the present invention provides an apparatus for calculating an inter-vehicle distance, the apparatus including: an information obtainment unit to obtain information about an inter-vehicle distance with a preceding vehicle at a temporal interval; an estimation unit to estimate an inter-vehicle distance with the preceding vehicle to be obtained by the information obtainment unit at a subsequent interval, based on the information obtained by the information obtainment unit; a physical limit determining unit to determine whether a absolute value obtained by subtracting a subsequent inter-vehicle distance estimated by the estimation unit from the inter-vehicle distance obtained by the information obtainment unit at the subsequent interval is greater than or equal to a predetermined inter-vehicle distance change range (Dth); and a correction unit to correct the inter-vehicle distance obtained by the information obtainment unit by determining that an error is present within the inter-vehicle distance obtained by the information obtainment unit at the subsequent interval, when the absolute value is greater than or equal to the predetermined inter-vehicle distance change range.

The information obtainment unit may obtain information about a relative speed with the preceding vehicle at the temporal interval, the estimation unit may estimate a relative speed with the preceding vehicle to be obtained by the information obtainment unit at the subsequent interval, based on information about the relative speed obtained by the information obtainment unit, the physical limit determining unit may determine whether a value obtained by subtracting a subsequent relative speed estimated by the estimation unit from the relative speed obtained by the information obtainment unit at the subsequent interval is greater than or equal to a predetermined relative speed change range (VRth), and the correction unit may correct the inter-vehicle distance obtained by the information obtainment unit by determining that an error is present within the inter-vehicle distance obtained by the information obtainment unit at the subsequent interval, when the value is greater than or equal to the predetermined relative speed change range.

The information obtainment unit may obtain information about a speed of the preceding vehicle at the temporal interval, the physical limit determining unit may determine whether a value obtained by subtracting a relative speed obtained by the information obtainment unit at a previous interval from a relative speed obtained by the information obtainment unit is greater than or equal to a predetermined physical change range (Pth), and the correction unit may correct the inter-vehicle distance obtained by the information obtainment unit by determining that an error is present within the inter-vehicle distance obtained by the information obtainment unit at the subsequent interval, when the value is greater than or equal to the predetermined physical change range.

The inter-vehicle distance calculating apparatus may further include an identical vehicle determining unit to determine whether the preceding vehicle that is a target of information obtained by the information obtainment unit is identical to a preceding vehicle that is a target of information previously obtained by the information obtainment unit.

The inter-vehicle distance calculating apparatus may further include an information transmitter to transmit, to a smart cruise control system, information about the inter-vehicle distance obtained by the information obtainment unit when the physical limit determining unit determines that the value is less than the predetermined inter-vehicle distance change range, or when the identical vehicle determining unit determines that the preceding vehicle is different, and to transmit, to the smart cruise control system, the inter-vehicle distance corrected by the correction unit when the identical vehicle determining unit determines that the preceding vehicle is identical and when the physical limit determining unit determines that the value is greater than or equal to the predetermined inter-vehicle distance change range.

Another exemplary embodiment of the present invention provides a method of calculating an inter-vehicle distance, the method including: an information obtaining operation of obtaining information about an inter-vehicle distance with a preceding vehicle at a temporal interval; an estimating operation of estimating an inter-vehicle distance with the preceding vehicle to be obtained at a subsequent interval in the information obtaining operation, based on the information obtained in the information obtaining operation; a physical limit determining operation of determining whether a value obtained by subtracting a subsequent inter-vehicle distance estimated in the estimating operation from the inter-vehicle distance obtained at the subsequent interval in the information obtaining operation is greater than or equal to a predetermined inter-vehicle distance change range (Dth); and a correcting operation of correcting the inter-vehicle distance in the information obtaining operation by determining that an error is present within the inter-vehicle distance obtained at the subsequent interval in the information obtaining operation, when the value is greater than or equal to the predetermined inter-vehicle distance change range.

The information obtaining operation may obtain information about a relative speed with the preceding vehicle at the temporal interval, the estimating operation may estimate a relative speed with the preceding vehicle to be obtained at the subsequent interval in the information obtaining operation, based on information about the relative speed obtained in the information obtaining operation, the physical limit determining operation may determine whether a value obtained by subtracting a subsequent relative speed estimated in the estimating operation from the relative speed obtained at the subsequent interval in the information obtaining operation is greater than or equal to a predetermined relative speed change range (VRth), and the correcting operation may correct the inter-vehicle distance obtained in the information obtaining operation by determining that an error is present within the subsequent inter-vehicle distance obtained at the subsequent interval in the information obtaining operation, when the value is greater than or equal to the predetermined relative speed change range.

The information obtaining operation may obtain information about a speed of the preceding vehicle at the temporal interval, the physical limit determining operation may determine whether a value obtained by subtracting a relative speed obtained at a previous interval in the information obtaining operation from a relative speed obtained in the information obtaining operation is greater than or equal to a predetermined physical change range (Pth), and the correcting operation may correct the inter-vehicle distance obtained in the information obtaining operation by determining that an error is present within the inter-vehicle distance obtained at the subsequent interval in the information obtaining operation, when the value is greater than or equal to the predetermined physical change range.

The inter-vehicle distance calculating method may further include an identical vehicle determining operation of determining whether the preceding vehicle that is a target of information obtained in the information obtaining operation is identical to a preceding vehicle that is a target of information previously obtained in the information obtaining operation.

The inter-vehicle distance calculating method may further include an information transmitting operation of transmitting, to a smart cruise control system, information about the inter-vehicle distance obtained in the information obtaining operation when the physical limit determining operation determines that the value is less than the predetermined inter-vehicle distance change range, or when the identical vehicle determining operation determines that the preceding vehicle is different, and of transmitting, to the smart cruise control system, the inter-vehicle distance corrected in the correcting operation when the identical vehicle determining operation determines that the preceding vehicle is identical and when the physical limit determining operation determines that the value is greater than or equal to the predetermined inter-vehicle distance change range.

According to exemplary embodiments of the present invention, when an error occurs within an inter-vehicle distance, it is possible to calculate a more accurate inter-vehicle distance by recognizing the error and by correcting the error.

According to exemplary embodiments of the present invention, it is possible to enable calculated inter-vehicle distance information to be utilized for precise vehicle control by transmitting the calculated inter-vehicle distance information to a system requiring inter-vehicle distance information such as a smart cruise control system and the like.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following description and the accompanying drawings, like reference numerals refer to like constituent elements and thus, the repeated description will be omitted. When it is determined that the detailed description related to a related known function or configuration may make the purpose of the present invention unnecessarily ambiguous in describing the present invention, the detailed description will be omitted here.

When it is described that a predetermined constituent element is "connected to" or "accessed to" another constituent element, the predetermined constituent element may be directly connected to or accessed to the other constituent element, however, should be understood that still another constituent element may be present between the predetermined constituent element and the other constituent element. On the other hand, when it is described that the predetermined constituent element is "directly connected to" or "directly accessed to" the other constituent element, it should be understood that still another constituent element is absent between the predetermined constituent element and the other constituent element.

In the present specification, unless particularly described in the sentence, a singular form may also include a plural form. "Includes (comprises)" and/or "including (comprising)" used in the present specification does not exclude the presence or addition of at least one another constituent element, step, operation, and/or device with respect to the described constituent element, step, operation, and/or device.

Figure 3:
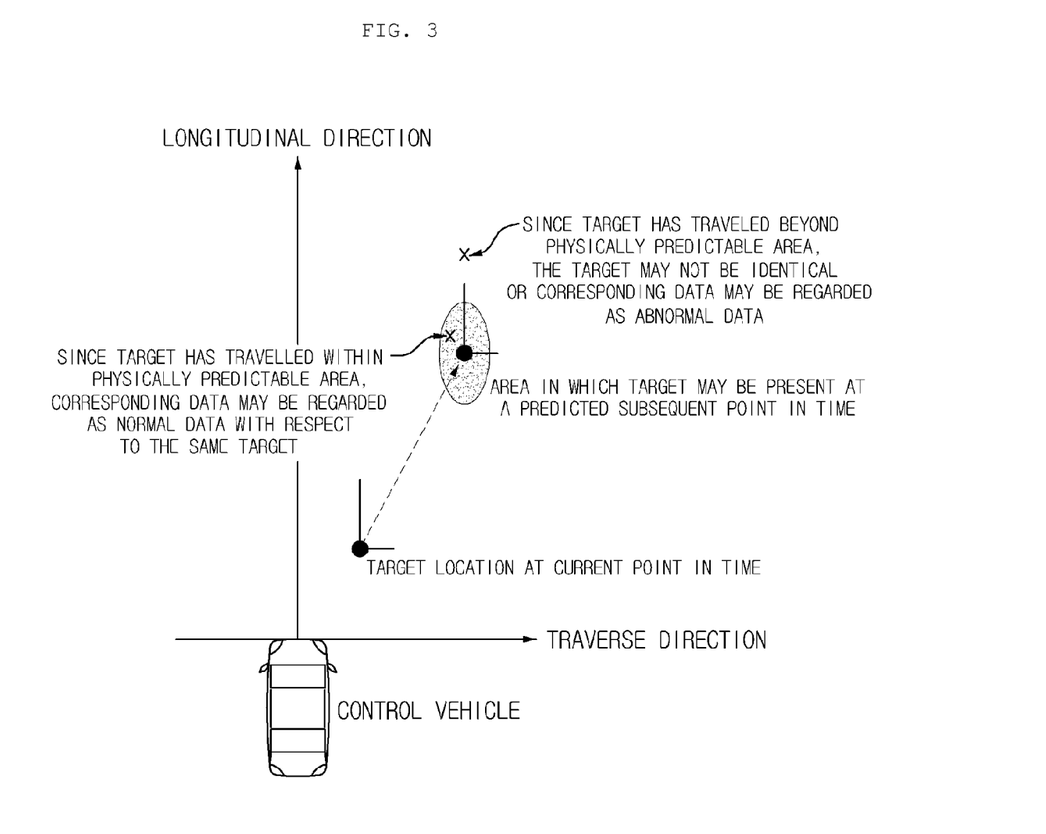
FIG. 3 is a diagram to describe an inter-vehicle distance calculating apparatus according to the present invention.

FIG. 3 is a diagram to describe an inter-vehicle distance calculating apparatus according to the present invention.

Referring to FIG. 3, the inter-vehicle distance calculating apparatus according to the present invention relates to an apparatus for correcting an error by setting a physical limit based on acceleration or deceleration performance of a vehicle using a principle that the vehicle may not travel beyond a limited area during a predetermined period of time, and by determining that the error is present within a measured inter-vehicle distance when the set physical limit is exceeded.

The inter-vehicle distance calculating apparatus according to the present invention is effective, particularly, in a slow speed circumstance and a near-distance circumstance.

When the vehicle runs at a high speed and an inter-vehicle distance is significantly distant, a phenomenon that an inter-vehicle distance measured by radar spontaneously varies barely occurs. Even though the phenomenon occurs, a change amount thereof is extremely small and thus does not affect a smart cruise control system and the like in controlling the vehicle.

Accordingly, the inter-vehicle distance calculating apparatus according to the present invention may be set to be utilized to calculate an inter-vehicle distance in a circumstance in which a preceding vehicle is driven at a low speed of about 30 k/h in a near distance of about 10 m or less with the preceding vehicle. Here, about 10 m and about 30 k/h are only examples and thus, the inter-vehicle distance calculating apparatus may be applied even to a further distant distance or a faster speed.

Figure 4:
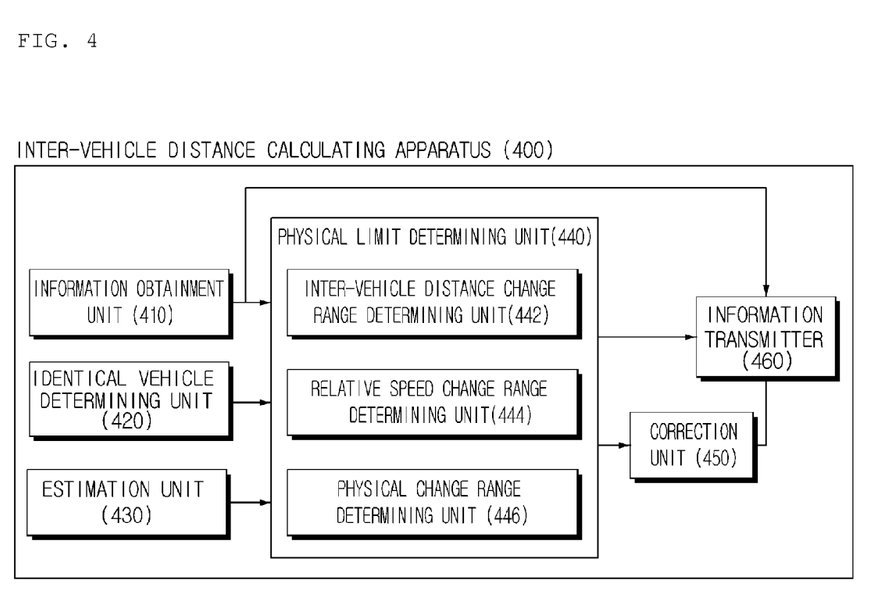
FIG. 4 is a block diagram illustrating an inter-vehicle distance calculating apparatus according to an exemplary embodiment of the present invention.

FIG. 4 is a block diagram illustrating an inter-vehicle distance calculating apparatus 400 according to an exemplary embodiment of the present invention.

Referring to FIG. 4, the inter-vehicle distance calculating apparatus 400 includes an information obtainment unit 410, an identical vehicle determining unit 420, estimation unit 430, a physical limit determining unit 440, a correction unit 450, and an information transmitter 460.

The information obtainment unit 410 obtains, from radar or an optical camera installed in a vehicle, an inter-vehicle distance with a preceding vehicle and information about at least one of a relative speed with the preceding vehicle and a speed of the preceding vehicle.

The radar or the optical camera measures information about at least one of the relative speed with the preceding vehicle and the speed of the preceding vehicle, and the inter-vehicle distance with the preceding vehicle in real time. The radar or the optical camera may periodically or aperiodically measure information about at least one of the relative speed with the preceding vehicle and the speed of the preceding vehicle, and the inter-vehicle distance with the preceding vehicle. For example, the radar or the optical camera may measure information about at least one of the relative speed with the preceding vehicle and the speed of the preceding vehicle, and the inter-vehicle distance with the preceding vehicle once per single interval by employing 50 ms as a single interval.

That the information obtainment unit 410 obtains information about at least one of the relative speed with the preceding vehicle and the speed of the preceding vehicle, and the inter-vehicle distance with the preceding vehicle is not necessarily limited to obtaining the above information from the radar or the optical camera installed in the vehicle. The above information may be obtained from various sensors installed in the vehicle.

The identical vehicle determining unit 420 determines whether a preceding vehicle that is a measurement target by the radar or the optical camera is identical. That is, when the radar measures information about at least one of the relative speed with the preceding vehicle and the speed of the preceding vehicle, and the inter-vehicle distance with the preceding vehicle once per single interval, the identical vehicle determining unit 420 determines whether a vehicle that is a current measurement target is identical to a vehicle that is a measurement target at a previous interval.

When the preceding vehicle is different, a measurement target of the radar or the optical camera is changed and thus, an inconsecutive point occurs in the inter-vehicle distance and the relative speed. Accordingly, when calculating the inter-vehicle distance by setting a physical limit, a wrong value may be calculated.

Accordingly, when the identical vehicle determining unit 420 determines that the preceding vehicle is different, it is desirable that the correction unit 450 does not correct the inter-vehicle distance even though a measurement value is beyond the physical limit range determined by the physical limit determining unit 440.

The identical vehicle determining unit 420 may determine whether the measurement target is an identical target based on tracking information that is measured by the radar or the optical camera. Additionally, the identical vehicle determining unit 420 may determine whether the preceding vehicle is identical based on information about a vehicle width that is measured by the radar or the optical camera.

That is, the radar or the optical camera may measure the inter-vehicle distance with the preceding vehicle and the relative speed with the preceding vehicle, may also collect tracking information of the preceding vehicle, and may also measure the vehicle width of the preceding vehicle.

The estimation unit 430 estimates a subsequent location and relative speed of the preceding vehicle based on information obtained by the information obtainment unit 410.

For example, when the radar measures the inter-vehicle distance and the relative distance at intervals of about 50 ms, the estimation unit 430 estimates the inter-vehicle distance and the relative speed after 50 ms that is a subsequent interval using an inter-vehicle distance and a relative speed currently measured by the radar. For more accurate estimation, in addition to the inter-vehicle distance and the relative speed currently measured by the radar, a previously measured inter-vehicle distance and relative speed may be utilized to estimate a subsequent inter-vehicle distance and relative speed after 50 ms.

Specifically, the estimation unit 430 may estimate an inter-vehicle distance and a relative speed to be measured by the radar at a subsequent interval using a Kalman filter.

More specifically, the estimation unit 430 may estimate the t inter-vehicle distance and relative speed to be measured by the radar at the subsequent interval using Equation 1 through Equation 3.

$$x(k)=[p_x(k)\,p_y(k)\,v_x(k)\,v_y(k)]^T \qquad \text{[Equation 1]}$$

Figure 5:
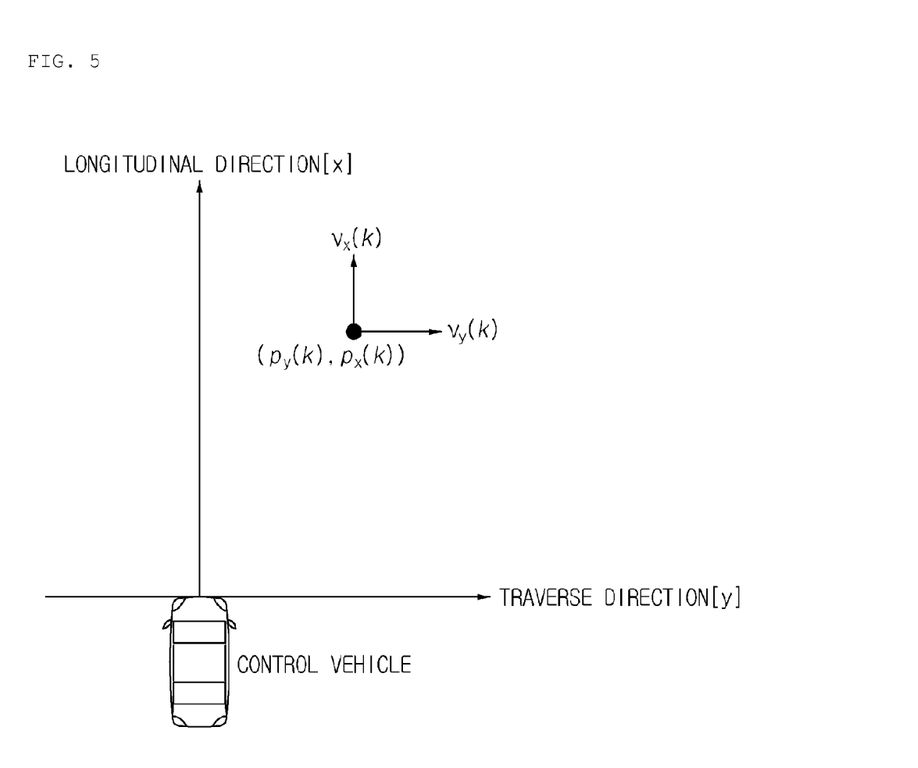
FIG. 5 is a diagram to describe Px(k), Py(k), Vx(k), and Vy(k).

FIG. 5 is a diagram to describe Px(k), Py(k), Vx(k), and Vy(k).

Equation 1 expresses a state variable. Referring to FIG. 5, Px(k) denotes a longitudinal relative distance and Py(k) denotes a traverse relative distance. Vx(k) denotes a longitudinal relative speed. Vy(k) denotes a traverse relative speed.

$$x(k+1) = \Phi \cdot x(k) + \Gamma \cdot \omega(k) \Rightarrow \begin{bmatrix} p_x(k+1) \\ v_x(k+1) \\ p_y(k+1) \\ v_y(k+1) \end{bmatrix} = \qquad \text{[Equation 2]}$$

$$\begin{bmatrix} 1 & \Delta T & 0 & 0 \\ 0 & 1 & 0 & 0 \\ 0 & 0 & 1 & \Delta T \\ 0 & 0 & 0 & 1 \end{bmatrix} \cdot \begin{bmatrix} p_x(k) \\ v_x(k) \\ p_y(k) \\ v_y(k) \end{bmatrix} + \begin{bmatrix} \Delta T & 0 \\ 1 & 0 \\ 0 & \Delta T \\ 0 & 1 \end{bmatrix} \cdot \begin{bmatrix} \omega_x(k) \\ \omega_y(k) \end{bmatrix}$$

Equation 2 is a system model using process noise that is defined as a probabilistic characteristic (Q) of a relative speed in a follow-up circumstance. The range of the process noise may be selected using a maximum value and a minimum value of a change amount of the relative speed.

$$z(k) = H \cdot x(k) + v(k) \Rightarrow \qquad \text{[Equation 3]}$$

$$\begin{bmatrix} z_1(k) \\ z_2(k) \end{bmatrix} = \begin{bmatrix} 1 & 0 & 0 & 0 \\ 0 & 0 & 0 & 0 \\ 0 & 0 & 1 & 0 \\ 0 & 0 & 0 & 0 \end{bmatrix} \cdot \begin{bmatrix} p_x(k) \\ v_x(k) \\ p_y(k) \\ v_y(k) \end{bmatrix} + \begin{bmatrix} 1 & 0 \\ 0 & 0 \\ 0 & 1 \\ 0 & 0 \end{bmatrix} \begin{bmatrix} v_1(k) \\ v_2(k) \end{bmatrix}$$

Equation 3 is an observation model using measurement noise that is defined as a probabilistic characteristic (R) of longitudinal and traverse location measurement values of a radar sensor. The range of the measurement noise may be selected based on the signal change range and a resolution rate.

$$x(k+1)=\Phi \cdot x(k)+\Gamma \cdot \omega(k) \Rightarrow (\text{Here, } \omega(k)\sim N(0,Q))$$

$$z(k)=H \cdot x(k)+v(k) \Rightarrow (\text{Here, } v(k)\sim N(0,R)) \qquad \text{[Equation 4]}$$

Equation 4 is an equation to induce a steady-state filter gain based on a probabilistic characteristic of the process noise and a probabilistic characteristic of the measurement noise. As described above, the process noise w(k) may be defined as the probabilistic characteristic (Q) of the relative speed in the follow-up circumstance, and the measurement noise v(k) may be defined as the probabilistic characteristic (R) of the longitudinal and traverse location measurement values of the radar sensor. That is, w(k) may be expressed as a probability function of which average is zero and variance is Q, and v(k) may be expressed as a probability function of which average is zero and variance is R.

The estimation unit 430 designed using Equation 1 through Equation 4 may be expressed as Equation 5.

[Equation 5]

Time-Update: $x(k+1|k) = \Phi \cdot x(k|k)$

Measurement-Update: $x(k+1|k+1) = x(k+1|k) + K \cdot [z(k) - H \cdot x(k+1|k)]$

In Equation 5, the estimation unit 430 estimates an inter-vehicle distance and a relative speed of a subsequent time or a subsequent interval desired to be estimated through Time-Update and Measurement-Update.

That is, a variable x(k+1) desired to be estimated from a variable x(k) is calculated. x(k+1) becomes traverse and longitudinal travel distances and traverse and longitudinal relative speeds of the subsequent time or the subsequent interval according to Equation 1. When using a travel distance, the inter-vehicle distance may be calculated.

Equation 1 through Equation 5 apply a method of configuring a logic using an estimation scheme such as the Kalman filter. Here, the estimation unit 430 is not limited to estimating the inter-vehicle distance and the relative speed to be measured by a sensor at the subsequent time or the subsequent interval using Equation 1 through Equation 5 or the Kalman filter, and may also estimate the inter-vehicle distance and the relative speed using other known arts.

The physical limit determining unit 440 sets a physical limit based on (f?) acceleration or deceleration performance of a vehicle using a principle that the vehicle may not travel beyond a limited area during a predetermined period of time, determines whether a measurement value is beyond the set physical limit, and determines whether an error is present within the inter-vehicle distance measured by the sensor.

Specifically, the physical limit determining unit 440 includes an inter-vehicle distance change range determining unit 442, a relative speed change range determining unit 444, and a physical change range determining unit 446.

The inter-vehicle distance change range determining unit 442 determines whether an inter-vehicle distance change range is greater than or equal to a predetermined inter-vehicle distance change range (Dth).

The inter-vehicle distance change range indicates a difference between an inter-vehicle distance measured by the information obtainment unit 410 at a predetermined time and an inter-vehicle distance estimated by the estimation unit 430 at the corresponding predetermined time.

The predetermined inter-vehicle distance change range (Dth) is a value changeable due to brake performance of a vehicle, a brake distance of the vehicle, a safety distance defined by a law, acceleration or deceleration performance of the vehicle, a measurement interval of a sensor, a request of a vehicle manufacturer or a user, and the like. For example, the predetermined inter-vehicle distance change range (Dth) may be determined as a predetermined value between 1 m and 2 m. When the inter-vehicle distance change range becomes to be greater than or equal to Dth, the predetermined inter-vehicle distance change range (Dth) is designated as a value that is determined as a case in which it is physically impossible or defective from a common-sense point of view based on the acceleration or deceleration performance of the vehicle. The above determination that it is physically impossible or defective from a common-sense point of view may be performed by also considering the relative speed. Considering the relative speed may be performed by the relative speed change range determining unit 444.

The relative speed change range determining unit 444 determines whether a relative speed change range is greater than or equal to a predetermined relative speed change range (VRth).

The relative speed change range indicates a difference between the inter-vehicle distance measured by the information obtainment unit 410 at the predetermined time and the inter-vehicle distance estimated by the estimation unit 430 at the corresponding predetermined time.

The predetermined relative speed change range (VRth) is a value changeable due to brake performance of the vehicle, the brake distance of the vehicle, the safety distance defined by the law, acceleration or deceleration performance of the vehicle, the measurement interval of the sensor, the request of the vehicle manufacturer or the user, and the like. For example, the predetermined relative speed change range (VRth) may be set to be about 1 m/s.

The physical change range determining unit 446 determines whether a physical change range is greater than or equal to a predetermined physical change range (Pth).

The physical change range indicates a difference between a vehicle speed of a preceding vehicle measured by the information obtainment unit 410 at the predetermined time and a vehicle speed of the preceding vehicle measured by the information obtainment unit at a subsequent time or a subsequent interval.

The predetermined physical change range (Pth) is a value changeable due to brake performance of the vehicle, the brake distance of the vehicle, acceleration or deceleration performance of the vehicle, the request of the vehicle manufacturer or the user, the measurement interval of the sensor, and the like. For example, the predetermined physical change range (Pth) may be set be about 10 m/s.

Specifically describing, when the sensor measures a speed of the preceding vehicle at intervals of 50 ms, the information obtainment unit 410 obtains speed information of the preceding vehicle measured by the sensor at intervals of 50 ms. When a speed of the preceding vehicle currently obtained by the information obtainment unit 410 is 60 km/h (16.67 m/s) and a speed of the preceding vehicle previously obtained at a previous interval of 50 ms that is a previous interval is 20 km/h (5.55 m/s), the physical change range is obtained by calculating a speed difference of the preceding vehicle corresponding to a single interval difference obtained by the information obtainment unit 410 and is compared with the predetermined physical change range (Pth). That is, since the physical change range 11.12 m/s (difference between 16.67 m/s and 5.55 m/s) is greater than the predetermined physical change range (Pth) 10 m/s, it is possible to determine that an error is present within the recognized inter-vehicle distance.

When the physical change range is greater than or equal to the predetermined physical change range (Pth), it is possible to determine that a measurement value is beyond the range of the acceleration or deceleration performance of the vehicle. That is, with a current technology and acceleration performance of the vehicle, it is impossible for the preceding vehicle driving at a speed of 20 km/h to accelerate by 40 km/h only after 50 ms and then to drive at a speed of 60 km/h. Therefore, it is reasonable to determine that an error is present within the recognized inter-vehicle distance due to a malfunction of the sensor and the like.

Similar to the aforementioned physical change range determining unit 446, even in the case of the inter-vehicle distance change range determining unit 442 and the relative speed change range determining unit 444, when a change greater than or equal to the predetermined inter-vehicle distance change range (Dth) or the predetermined relative speed change range (VRth) occurs, the above change is a change of a level impossible based on performance of the vehicle and the like and thus, it is reasonable to determine that the error is present within the inter-vehicle distance measured by the sensor. That is, the inter-vehicle distance change range determining unit 442 may determine whether the inter-vehicle distance change range is greater than or equal to the predetermined inter-vehicle distance change range (Dth), and may determine that the error is present within the inter-vehicle distance measured by the sensor when the inter-vehicle distance change range is greater than or equal to the predetermined inter-vehicle distance change range (Dth). Similarly, the relative speed change range determining unit 444 may determine whether the relative speed change range is greater than or equal to the predetermined relative speed change range (VRth), and may determine that the error is present within the inter-vehicle distance measured by the sensor when the relative speed change range is greater than or equal to the predetermined relative speed change range (VRth).

To more accurately determine that the error is present within the recognized inter-vehicle distance, only when all of the inter-vehicle distance change range determining unit 442, the relative speed change range determining unit 444, and the physical change range determining unit 446 determine that the error is present, it is possible to determine that the error is present within the inter-vehicle distance measured by the sensor. On the other hand, when at least one of the inter-vehicle distance change range determining unit 442, the relative speed change range determining unit 444, and the physical change range determining unit 446 determines that the error is present, it is also possible to determine that the error is present within the inter-vehicle distance measured by the sensor.

When the physical limit determining unit 440 determines that the error is present within the inter-vehicle distance measured by the sensor, the correction unit 450 may correct the error.

The correction unit 450 estimates an offset distance between a location of the vehicle measured by the sensor and a rear location of the vehicle, and corrects the measured inter-vehicle distance by the estimated offset distance. Estimation of the offset distance may utilize an existing technology.

When the physical limit determining unit 440 determines that the error is present within the inter-vehicle distance measured by the sensor, the correction unit 450 may add about 2 m to 5 m to the measured inter-vehicle distance or may subtract about 2 m to 5 m from the measured inter-vehicle distance based on the whole length of the vehicle in order to secure the safety distance or the brake distance.

The information transmitter 460 may transmit inter-vehicle distance information corrected by the correction unit 450 to a place needing inter-vehicle distance information with the preceding vehicle, such as a smart cruise control system and the like.

Figure 6:
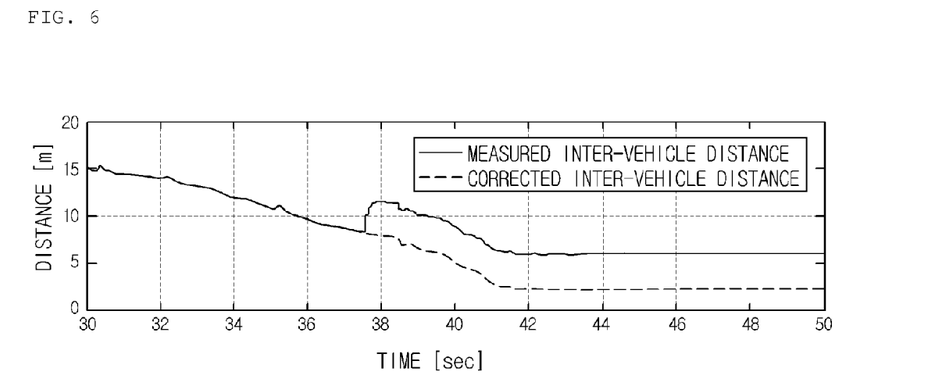
FIG. 6 is a graph illustrating an example of a result of correcting, by a correction unit of an inter-vehicle distance calculating apparatus, a measured inter-vehicle distance according to the present invention.

FIG. 6 is a graph illustrating an example of a result of correcting, by a correction unit of an inter-vehicle distance calculating apparatus, a measured inter-vehicle distance according to the present invention.

Specifically, FIG. 6 illustrates a result of correcting, by the correction unit 450, an inter-vehicle distance when the physical limit determining unit 440 determines that an error is present within the inter-vehicle distance measured between 37 seconds and 38 seconds.

Referring to FIG. 6, the result of estimating, by the correction unit 450, an offset distance between a location of a vehicle and a rear location of the vehicle and correcting the measured inter-vehicle distance by the estimated offset distance is indicated as a dotted line.

That is, in an actual driving circumstance, even though an actual inter-vehicle distance is about 8 m, a sensor outputs about at least 10 m of a detection distance around 38 seconds due to error recognition and lower end detection. When a smart cruise control system controls the vehicle to be stopped based on the inter-vehicle distance of 10 m erroneously measured by the sensor, the vehicle is stopped within 3 m, not 5 m that is a target stoppage distance. Accordingly, a collision accident with the preceding vehicle may occur. However, when the smart cruise control system utilizes the inter-vehicle distance corrected through the inter-vehicle distance calculating apparatus 400 according to the present invention, the smart cruise control system may control the vehicle to be stopped within the target stoppage distance.

The inter-vehicle distance calculating apparatus 400 according to the present invention may determine whether the error is present within the inter-vehicle distance measured by the sensor, and may calculate a more accurate inter-vehicle distance by recognizing and correcting the error when the error occurs within the inter-vehicle distance.

Inter-vehicle distance information calculated by the inter-vehicle distance calculating apparatus 400 according to the present invention may be transmitted to a system needing the inter-vehicle distance information such as a smart cruise control system and the like to thereby be utilized for precise vehicle control.

Figure 7:
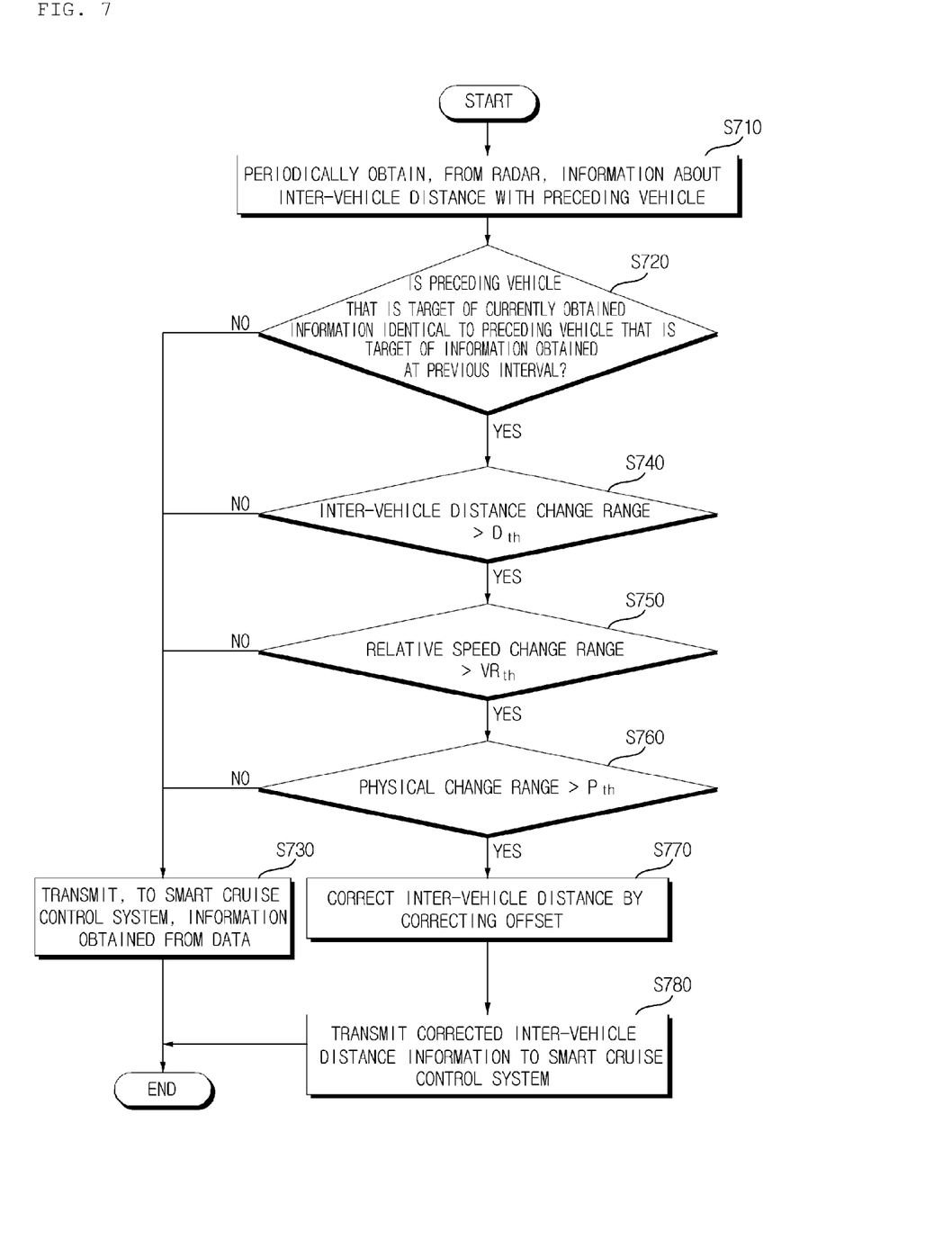
FIG. 7 is a flowchart illustrating a method of calculating an inter-vehicle distance according to an exemplary embodiment of the present invention.

FIG. 7 is a flowchart illustrating a method of calculating an inter-vehicle distance according to an exemplary embodiment of the present invention.

Describing the method of calculating the inter-vehicle distance with reference to FIG. 7, the information obtainment unit 410 periodically obtains, from a sensor such as radar installed in a vehicle and the like, an inter-vehicle distance with a preceding vehicle and information about at least one of a relative speed with the preceding vehicle and a speed of the preceding vehicle (operation S710).

The identical vehicle determining unit 420 determines whether a preceding vehicle that is a target of information currently obtained by the information obtainment unit 410 is identical to a preceding vehicle that is a target of information obtained at a previous interval (operation S720).

When the identical vehicle determining unit 420 determines that the preceding vehicle is different, the information transmitter 460 may directly transmit information obtained by the information obtainment unit 410 to a place needing the information, such as a smart cruise control system and the like, without a need for the correction unit 450 to correct the information (operation S730).

When the identical vehicle determining unit 420 determines that the preceding vehicle is identical, the physical limit determining unit 440 determines whether an error is present within the inter-vehicle distance measured by the sensor.

Specifically, the inter-vehicle distance change range determining unit 442 of the physical limit determining unit 440 determines whether an inter-vehicle distance change range is greater than or equal to a predetermined inter-vehicle distance change range (Dth) (operation S740).

When the inter-vehicle distance change range is greater than or equal to the predetermined inter-vehicle distance change range (Dth), the relative speed change range determining unit 444 of the physical limit determining unit 440 determines whether a relative speed change range is greater than or equal to a predetermined relative speed change range (VRth) (operation S750).

When the relative speed change range is greater than or equal to the predetermined relative speed change range (VRth), the physical change range determining unit 446 of the physical limit determining unit 440 determines whether a physical change range is greater than or equal to a predetermined physical change range (Pth) (operation S760).

When the physical change range determining unit 446 determines that the physical change range is greater than or equal to the predetermined physical change range (Pth), the correction unit 450 estimates an offset distance between a location of the vehicle measured by the sensor and a rear location of the vehicle, and corrects the measured inter-vehicle distance by the estimated offset distance (operation S770).

The information transmitter 460 may transmit corrected inter-vehicle distance information to a place needing the inter-vehicle distance information, such as a smart cruise control system and the like (operation S780).

Operations S740 through S760 may be sequentially performed and may also be equivalently performed. Only at least one of operations S740 through S760 may be performed. Even when "yes" is determined in any one of operations S740 through S760, the correction unit 450 may correct the measured inter-vehicle distance.

When "no" is determined in any one of operations S740 through S760, the information transmitter 460 may transmit inter-vehicle distance information obtained by the information obtainment unit 410 to a place needing the inter-vehicle distance information, such as the smart cruise control system and the like (operation S730). Alternatively, when operations S740 through S760 are equivalently or selectively performed, the information transmitter 460 may transmit inter-vehicle distance information obtained by the information obtainment unit 410 to a place needing the inter-vehicle distance information, such as the smart cruise control system and the like, only when "no" is determined in all of operations S740 through S760.

The block diagram of the inter-vehicle distance calculating apparatus 400 according to then exemplary embodiment of the present invention should be understood to indicate an exemplary conceptual point of view for embodying a principle of the present invention. Similarly, all of the flowcharts should be understood to be substantially expressed in computer-readable media and to express a variety of processes performed by a computer or a processor, regardless of whether the computer or the processor is clearly illustrated.

Functions of various devices illustrated in the drawings including functional blocks that are expressed as a processor or a concept similar thereto may be provided for use of dedicated hardware and use of hardware having a capability to execute software in association with appropriate software. When the functions are provided by the processor, the functions may be provided by a single dedicated processor, a single shared processor, or a plurality of individual processors, and a portion thereof may be shared.

Clear use of the processor, control, or terminology proposed as a similar concept thereto should not be interpreted by exclusively citing hardware having the capability to execute software, and should be understood to allusively include digital signal processor (DSP) hardware, ROM for storing software, RAM, and a non-volatile memory without restriction.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus configured to calculate an inter-vehicle distance, the apparatus comprising:
an information obtainment unit configured to obtain information about an inter-vehicle distance with a preceding vehicle at a temporal interval;
an estimation unit configured to estimate an inter-vehicle distance with the preceding vehicle to be obtained by the information obtainment unit at a subsequent interval, based on the information obtained by the information obtainment unit;
a physical limit determining unit configured to determine whether an absolute value obtained by subtracting a subsequent inter-vehicle distance estimated by the estimation unit from the inter-vehicle distance obtained by the information obtainment unit at the subsequent interval is greater than or equal to a predetermined inter-vehicle distance change range (Dth) wherein the physical limit determining unit sets a physical limit and determines whether an error is present within the inter-vehicle distance;
a correction unit configured to correct the inter-vehicle distance obtained by the information obtainment unit by determining that an error is present within the inter-vehicle distance obtained by the information obtainment unit at the subsequent interval, when the absolute value is greater than or equal to the predetermined inter-vehicle distance change range; and
an information transmitter configured to transmit the inter-vehicle distance corrected by the correction unit to a vehicle control system for vehicle control.

2. The apparatus of claim 1, wherein:
the information obtainment unit is further configured to obtain information about a relative speed with the preceding vehicle at the temporal interval,
the estimation unit is further configured to estimate a relative speed with the preceding vehicle to be obtained by the information obtainment unit at the subsequent interval, based on information about the relative speed obtained by the information obtainment unit,
the physical limit determining unit is further configured to determine whether a value obtained by subtracting a subsequent relative speed estimated by the estimation unit from the relative speed obtained by the information obtainment unit at the subsequent interval is greater than or equal to a predetermined relative speed change range (VRth), and
the correction unit is further configured to correct the inter-vehicle distance obtained by the information obtainment unit by determining that an error is present within the inter-vehicle distance obtained by the information obtainment unit at the subsequent interval, when the value is greater than or equal to the predetermined relative speed change range.

3. The apparatus of claim 1, wherein:
the information obtainment unit is further configured to obtain information about a speed of the preceding vehicle at the temporal interval,
the physical limit determining unit is further configured to determine whether a value obtained by subtracting a relative speed obtained by the information obtainment unit at a previous interval from a relative speed obtained by the information obtainment unit is greater than or equal to a predetermined physical change range (Pth), and
the correction unit is further configured to correct the inter-vehicle distance obtained by the information obtainment unit by determining that an error is present within the inter-vehicle distance obtained by the information obtainment unit at the subsequent interval, when the value is greater than or equal to the predetermined physical change range.

4. The apparatus of claim 1, further comprising:
an identical vehicle determining unit configured to determine whether the preceding vehicle that is a target of information obtained by the information obtainment unit is identical to a preceding vehicle that is a target of information previously obtained by the information obtainment unit.

5. The apparatus of claim 4, wherein:
the information transmitter is further configured to transmit, to a smart cruise control system, information about the inter-vehicle distance obtained by the information obtainment unit when the physical limit determining unit determines that the value is less than the predetermined inter-vehicle distance change range, or when the identical vehicle determining unit determines that the preceding vehicle is different, and to transmit, to the smart cruise control system, the inter-vehicle distance corrected by the correction unit when the identical vehicle determining unit determines that the preceding vehicle is identical and when the physical limit determining unit determines that the value is greater than or equal to the predetermined inter-vehicle distance change range.

6. The apparatus of claim 1, wherein the estimation unit is further configured to estimate the inter-vehicle distance by a longitudinal and traverse relative distance and a longitudinal and traverse relative speed.

7. The apparatus of claim 1, wherein the inter-vehicle distance and a relative distance are measured at intervals of about 50 ms.

8. The apparatus of claim 1, wherein the predetermined inter-vehicle distance change range (Dth) is a variable due to brake performance of the vehicle, a brake distance of the vehicle, a safety distance, acceleration or deceleration performance of the vehicle, a measurement interval of a sensor, or a request of a vehicle manufacturer or a user.

9. The apparatus of claim 8, wherein the predetermined inter-vehicle distance change range (Dth) is a value between 1 m and 2 m.

10. The apparatus of claim 1, wherein an inter-vehicle distance change range determining unit, a relative speed change range determining unit, and a physical change range determining unit determine that the error is present within the inter-vehicle distance.

11. The apparatus of claim 10, wherein the inter-vehicle distance change range determining unit, or the relative speed change range determining unit, or the physical change range determining unit determine that the error is present within the inter-vehicle distance.

12. The apparatus of claim 1, wherein the preceding vehicle travels within a physically predictable area.

13. The apparatus of claim 1, wherein the physical limit determining unit includes an inter-vehicle distance change range determining unit, a relative speed change range determining unit and a physical change range determining unit.

14. The apparatus of claim 1, wherein a control vehicle is stopped within a target stoppage distance, by the vehicle control system.

15. A method of calculating an inter-vehicle distance implemented by a processor, the method comprising:
an information obtaining operation of obtaining information about an inter-vehicle distance with a preceding vehicle at a temporal interval by an information obtainment hardware unit;
an estimating operation of estimating an inter-vehicle distance with the preceding vehicle to be obtained at a subsequent interval in the information obtaining operation, based on the information obtained in the information obtaining operation by an estimation hardware unit;
a physical limit determining operation of determining whether a value obtained by subtracting a subsequent inter-vehicle distance estimated in the estimating operation from the inter-vehicle distance obtained at the subsequent interval in the information obtaining operation is greater than or equal to a predetermined inter-vehicle distance change range (Dth) by a physical limit determining hardware unit wherein the physical limit determining hardware unit sets a physical limit and determines whether an error is present with in the inter-vehicle distance;
a correcting operation of correcting the inter-vehicle distance in the information obtaining operation by determining that an error is present within the inter-vehicle distance obtained at the subsequent interval in the information obtaining operation, when the value is greater than or equal to the predetermined inter-vehicle distance change range by a correction hardware unit; and
a transmitting operation of transmitting the inter-vehicle distance corrected by the correcting operation to vehicle control system for vehicle control.

16. The method of claim 15, wherein:
obtaining the information obtaining operation obtains information about a relative speed with the preceding vehicle at the temporal interval,
the estimating operation estimates a relative speed with the preceding vehicle to be obtained at the subsequent interval in the information obtaining operation, based on information about the relative speed obtained in the information obtaining operation,
the physical limit determining operation determines whether a value obtained by subtracting a subsequent relative speed estimated in the estimating operation from the relative speed obtained at the subsequent interval in the information obtaining operation is greater than or equal to a predetermined relative speed change range (VRth), and
the correcting operation corrects the inter-vehicle distance obtained in the information obtaining operation by determining that an error is present within the subsequent inter-vehicle distance obtained at the subsequent interval in the information obtaining operation, when the value is greater than or equal to the predetermined relative speed change range.

17. The method of claim 15, wherein:
the information obtaining operation obtains information about a speed of the preceding vehicle at the temporal interval,
the physical limit determining operation determines whether a value obtained by subtracting a relative speed obtained at a previous interval in the information obtaining operation from a relative speed obtained in the information obtaining operation is greater than or equal to a predetermined physical change range (Pth), and
the correcting operation corrects the inter-vehicle distance obtained in the information obtaining operation by determining that an error is present within the inter-vehicle distance obtained at the subsequent interval in the information obtaining operation, when the value is greater than or equal to the predetermined physical change range.

18. The method of claim 15, further comprising:
an identical vehicle determining operation of determining whether the preceding vehicle that is a target of information obtained in the information obtaining operation is identical to a preceding vehicle that is a target of information previously obtained in the information obtaining operation.

19. The method of claim 18, further comprising:
an information transmitting operation of transmitting, to a smart cruise control system, information about the inter-vehicle distance obtained in the information obtaining operation when the physical limit determining operation determines that the value is less than the predetermined inter-vehicle distance change range, or when the identical vehicle determining operation determines that the preceding vehicle is different, and of transmitting, to the smart cruise control system, the inter-vehicle distance corrected in the correcting operation when the identical vehicle determining operation determines that the preceding vehicle is identical and when the physical limit determining operation determines that the value is greater than or equal to the predetermined inter-vehicle distance change range.

20. The method of claim 15, wherein the physical limit is based on acceleration or deceleration performance of a vehicle.

* * * * *